United States Patent [19]

Colak

[11] Patent Number: 5,666,467
[45] Date of Patent: Sep. 9, 1997

[54] NEURAL NETWORK USING INHOMOGENEITIES IN A MEDIUM AS NEURONS AND TRANSMITTING INPUT SIGNALS AS AN UNCHANNELLED WAVE PATTERN THROUGH THE MEDIUM

[75] Inventor: Sel B. Colak, Eindhoven, Netherlands

[73] Assignee: U.S. Philips Corporation, New York, N.Y.

[21] Appl. No.: 201,609

[22] Filed: Feb. 25, 1994

[30] Foreign Application Priority Data

Mar. 3, 1993 [EP] European Pat. Off. ............. 93200603

[51] Int. Cl.$^6$ .................. G06E 1/00; G06E 3/00; G06F 15/18; G06G 7/00
[52] U.S. Cl. .................. 395/24; 395/21; 395/26
[58] Field of Search ............... 382/12–15, 155–159; 395/20–25, 27; 365/163; 364/807; 250/214

[56] References Cited

U.S. PATENT DOCUMENTS

| | | | |
|---|---|---|---|
| 4,866,645 | 9/1989 | Lish | 364/602 |
| 4,873,455 | 10/1989 | de Chambost et al. | 395/24 |
| 4,876,668 | 10/1989 | Thakoor et al. | 365/163 |
| 4,994,982 | 2/1991 | Duranton et al. | 364/513 |
| 5,039,871 | 8/1991 | Engeler | 364/807 |
| 5,129,040 | 7/1992 | Hanazato et al. | 395/25 |
| 5,204,521 | 4/1993 | Lin et al. | 250/214 |
| 5,212,377 | 5/1993 | Rosan | 250/214 |
| 5,214,745 | 5/1993 | Sutherland | 395/22 |
| 5,267,347 | 11/1993 | Isoda et al. | 395/25 |
| 5,319,737 | 6/1994 | Reibling et al. | 395/21 |
| 5,371,834 | 12/1994 | Tawel | 395/23 |
| 5,422,982 | 6/1995 | Pernisz | 395/24 |

OTHER PUBLICATIONS

Lippmann, "An Introduction to Computing with Neural Nets", IEEE ASSP Magazine Apr. 1987, pp. 4–22.

Abu-Mostafa et al., "Optical Neural Computers", Scientific American, Mar. 1987, pp. 66–73.

Giles et al., "Learning, inverariance, and generalization in high-order neural networks", Applied Optics, vol. 26, No. 23, Dec. 1, 1987, pp. 4972–4978.

Hopfield, "Neural networks and physical systems with emergent collective computational abilities", Proc. Natl. Acad. Sci., USA, vol. 79, pp. 2554–2558 Apr. 1982.

Kinzel et al., "Der ganz andere Computer: Denken nach Menschen Art", Bild der Wissenschaft Jan. 1988, pp. 37–47.

Shibata et al., "A Functional MOS Transistor Featuring Gate-Level Weighted Sum and Threshold Operations", IEEE Transactions on Electron Devices, vol. 39, No. 6, Jun. 1992, pp. 1444–1455.

Clark et al, "Integrated circuit neural network using ferroelectric analog memory"; Eleventh annual international phoenix conference on computers and communications, pp. 736–742, 1–3 Apr. 1992.

Ferraris et al, "A neural network for fast-response ultrasonic distance sensors"; Conference record IMTC/93, pp. 631–635, 18–20 May 1993.

*Primary Examiner*—Tariq R. Hafiz
*Attorney, Agent, or Firm*—Anne E. Barschall

[57] ABSTRACT

An information processing system comprises a neural net with fully distributed neuron and synapse functionalities in a spatially inhomogeneous medium to propagate a response field from an input to an output. The response field is a reaction of the medium to a plurality of input signals and depends non-linearly on the input signals. The response field is also determined by the inhomogeneities. The value of the field at one or more particular locations is indicative of one or more output signals of the neural net.

15 Claims, 5 Drawing Sheets

| X | $\begin{pmatrix}0\\0\\0\end{pmatrix}$ | $\begin{pmatrix}0\\1\\0\end{pmatrix}$ | $\begin{pmatrix}1\\0\\0\end{pmatrix}$ | $\begin{pmatrix}0\\1\\1\end{pmatrix}$ | $\begin{pmatrix}1\\0\\1\end{pmatrix}$ | $\begin{pmatrix}1\\1\\0\end{pmatrix}$ | $\begin{pmatrix}1\\1\\1\end{pmatrix}$ |
|---|---|---|---|---|---|---|---|
| $I_1$ | 0 | 3,8 | 3,9 | 6,8 | 6,9 | 7,8 | 10,5 |
| $I_2$ | 0 | 8,1 | 8,4 | 10,1 | 10,3 | 10,6 | 12,2 |
| $I_3$ | 0 | 0,8 | 0,9 | 3,5 | 3,6 | 4,6 | 7,5 |
| $I_4$ | - | - | - | - | - | - | - |
| $I_5$ | 0 | 0,9 | 1,1 | 2,8 | 2,9 | 3,7 | 6,0 |

Table I

FIG. 9

| X | $\begin{pmatrix}0\\1\\0\end{pmatrix}$ | $\begin{pmatrix}1\\0\\0\end{pmatrix}$ | $\begin{pmatrix}0\\1\\1\end{pmatrix}$ | $\begin{pmatrix}1\\0\\1\end{pmatrix}$ | $\begin{pmatrix}1\\1\\0\end{pmatrix}$ | $\begin{pmatrix}1\\1\\1\end{pmatrix}$ |
|---|---|---|---|---|---|---|
| $I_2-I_1$ | 4,3 | 4,5 | 3,3 | 3,4 | 2,8 | 1,7 |
| $I_5-I_3$ | 0,1 | 0,2 | -0,7 | -0,7 | -0,9 | -1,5 |

Table II

NEURAL NETWORK USING INHOMOGENEITIES IN A MEDIUM AS NEURONS AND TRANSMITTING INPUT SIGNALS AS AN UNCHANNELLED WAVE PATTERN THROUGH THE MEDIUM

FIELD OF THE INVENTION

The invention relates to an information processing system with a neural net functionally comprised of neurons interconnected by synapses. The network has an input means to receive a plurality of input signals, an output means to provide at least one output signal, and an arrangement between the input means and the output means to implement a neural transformation of the plurality of input signals for generating the output signal.

BACKGROUND ART

Over the last decade, neural networks have attracted an ever increasing interest as signal processors. Such processors, essential characteristics reside in the non-linear mapping of input signals onto output signals using spatially distributed elements and massively parallel information processing in a densely interconnected structure. Such a processor is a robust and fault-tolerant processing device. Furthermore, neural networks can be programmed by means of training on the basis of examples rather than by means of prescribing algorithmic instructions such as in the field of conventional microprocessors. Training can be accomplished with or without a supervisor, the latter version being called "self-learning". Neural networks are expected to play an important role, especially in the fields of associative memories, classifiers, pattern recognition and optimization problems. For a general introduction, see: "An Introduction to Computing with Neural Nets", R. P. Lippmann, IEEE ASSP Magazine, April 1987, pp. 4-22.

Although some of the mathematical algorithms created for neural network control or neural network simulation appear to be useful in seeking software solutions to particular problems, the real benefit of the neural network approach is believed to be obtainable only by way of dedicated hardware. A variety of electronic and optical hardware implementations of neural networks have seen the light over the last decade. For example, the Laboratoires d'Électronique de Philips has developed the first commercially electronic, fully digitally operating, trainable neural chip for modular neural network architectures, see U.S. Pat. No. 4,994,982. An electronic implementation of an analog neural net is known from, for instance, U.S. Pat. No. 4,866,645. Optical neural nets are dealt with in: "Optical Neural Computers", Y. S. Abu-Mostafa and D. Psaltis, Scientific American 256, March 1987, pp. 66-73.

Often, spatially tight designs are required to realize a sufficiently large number of the neurons and synapses in a confined space. A trainable neural net requires additional circuitry to individually and accurately modify the weights in the net's learning phase, necessarily leading to an increase of the system's size and complexity. Since the processing capability of a neural net increases with larger numbers of neurons and interconnections, nowadays efforts in neural net technology find a major target in increasing the density of neurons and interconnections. As an example, a major problem encountered in the design of electronic embodiments is the limitation to the number of neurons or neuron functionalities that can be implemented on a single chip. Typically, the maximum number of neurons or neuron functionalities that can be integrated into a chip using state of the art technology is well lower than one thousand. Furthermore, the complexity and the amount of additional components needed to implement the learning capability of a net containing such large numbers of neurons is expected to be at least proportionally higher.

The examples mentioned above have in common that the associated architectures primarily have a lumped character. That is, the various respective functional elements of the neural net which perform the basic computations, such as the neurons and the synapses, are implemented by physically distinct devices or circuits. These devices and circuits are dedicated to operations such as weight multiplication, summation and applying a sigmoid function.

One of the ways to reduce of the number of neurons or neuron layers, to simplify the interconnection scheme and to increase efficiency, is to employ high-order terms (squares, products, cubes, etc.) of the input signals supplied to the neural net. These high-order terms then serve as the signals to be handled by the neurons. See, for instance, C. Lee Giles et at., "Learning, Invariance and Generalization in High-Order Neural Nets", Appl. Opt., Vol. 26, 1987, pp. 4972-4978. The high-order dependencies are determined in advance and can be thought of as pre-processed input data, the pre-processing being based on some prior knowledge of the kind of problems that the neural net is meant to solve. For example, different classification problems to be handled by a neural net may require different forms of non-linear correlations between the input signals.

OBJECT OF THE INVENTION

In view of the limitations discussed above, it is therefore an object of the invention to provide an information processing system comprising a radically new neural net architecture, which permits integration of larger numbers of neuron functionalities and is highly technology-independent.

SUMMARY OF THE INVENTION

To this end, the invention provides an information processing system having a neural net that is functionally comprised of neurons interconnected by synapses. The net has an input means to receive a plurality of input signals, an output means to provide at least one output signal, and an arrangement between the input means and the output means to implement a neural transformation of the plurality of input signals for generating the output signal. According to the invention, the arrangement comprises a physical medium operative to propagate a response field throughout the medium in response to the plurality of input signals, the response field being non-linearly dependent on at least one of the input signals. The medium has one or more spatially distributed inhomogeneities operative to affect a spatial dependence of the field. The medium is operative to produce the output signal upon coupling at least a first response, representative of the field occurring at a first location in the medium, to the output means.

The invention is based on the insight that the energy level of the medium's ground state depends on the boundary conditions applied. Upon exciting the medium under respective different boundary conditions will lead to the medium settling in respective different lowest states. In this way, the boundary conditions serve as an input signal and the associated lowest energy configuration serves as an output signal, whose non-linear relation to the input signal is determined by the specific boundary conditions applied. In this manner, the mapping required for neural net operation can be attained using fully and substantially continuously distributed and collective physical properties of a spatially inhomogeneous medium. The medium may be an amorphous or a structured material, and may include a solid, a liquid, a gas, a plasma, etc. The relevant properties are associated with, for example, electrical, magnetic, electrodynamic or acoustic fields, or with phenomena involving the conversion from, e.g., an electric field into an acoustic field, etc.

The non-linear mapping and the mutual signal correlation are achieved in a spatially fully distributed and parallel fashion without necessitating clearly defined locations for neuron functionalities and synapse functionalities. This enhances the characteristic robustness proper to neural nets even further and, more importantly, avoids the spatial limitations inherent in conventional lumped systems. Consequently, higher densities of neuron functionalities and synapse functionalities are attainable in the invention. In addition, implementing the invention relies on the possibility of tailoring the non-linearities required in neural net operation to fit the properties achievable from various materials and devices. Since all materials exhibit in some way or another a non-linear behaviour, the invention considerably extends the field of suitable technologies to functionally realize a neural net.

Essential aspects of the neural net's internal operation include signal inhibition and signal crossing. Inhibition is a signal operation to decrease or reverse the signal's contribution to the collective behaviour. Signal crossing occurs when two or more input signals each individually affect two or more output signals. In case the non-linear characteristic is substantially monotonic within the parameter range used, additional measures may be required to obtain inhibition and signal crossing.

In case the medium's stimulus-response characteristic is substantially monotonic, the arrangement comprises encoding means coupling the physical medium to the output means for producing the output signal upon mutually correlating the first response and a second response. The operation of the encoding may involve, for example, a difference between a pair of responses, a ratio of a respective response and an aggregate sum of responses, or a change of a respective response brought about by a change of a particular one of the input signals.

Input signals may have different types. For example, one input signal may be of a dc voltage or of the energy of a photon, another one may be a current or an ac voltage.

The arrangement may be provided with a connection means between at least a second location and a third location in the medium to enable an interaction between the response field at the second location and the response field at the third location. Such an interconnection means permits circumventing short range effects due to screening. Screening effects will occur in systems that are large in relation to the range of certain interactions. These effects will adversely affect the discrimination between responses to different sets of input signals. Therefore, beyond a given size of the system in the invention, resolution and noise become important. One way of compensating for these drawbacks is to use more contacts to extract more responses that combined produce the output signal(s). Another way is to provide a few long-range interconnections.

Preferably, the arrangement comprises a control means to selectively modify the spatially distributed inhomogeneities with regard to at least position, size or strength. As mentioned the inhomogeneities interact with the continuous field in the medium. Selectivity modifying the inhomogeneities provides a learning feature to the neural net of the invention.

An implementation of a neural net in the invention is a two-dimensional electronic transport layer composed of distributed, non-linear conduction paths between input contacts and output contacts. The transport layer can be implemented by use of sub-threshold conduction of semiconductor field-effect devices or by use of conducting granular layers of organic material or superconducting material. In a semiconductor embodiment, the inhomogeneities may be formed by inversion layers and depletion layers brought about by charged floating gates. By means of a mechanism that modifies the charge trapped at such a floating gate, the inhomogeneities can be adapted.

Another embodiment utilizes a non-linear optical system instead of the non-linear electronic transport layer discussed in the previous paragraph. Such a system then may be based on, for example, generating speckle patterns, i.e., interference patterns brought about by scattering, or second harmonic patterns in a material with an light-intensity dependent index of refraction when subjected to laser light.

It is noted that prior art literature associates a Hopfield neural network with spin glass systems. Spin glass systems assume macroscopic states based on the collective behaviour of microscopic spins. Once excited, the spin glass traverses an extremely long sequence of collective spin states until an equilibrium will be attained dependent on the initial excitation. This may take hours or even days. See, for instance, "Neural networks and physical systems with emergent collective computational abilities", J. J. Hopfield, Proc. Nat. Acad. Sci. USA, Vol. 79, pp. 2554–2558, April 1982, and "Der ganz andere Computer: Denken nach Menschen Art ", W. Kinzel et al., Bild der Wissenschaft 1-1988, pp. 37–47. Spin glass systems occur in materials such as Au(Fe) and Cu(Mn) alloys and Cd1-xMnxTe semi-magnetic semiconductors, in electronic dipole glasses (K0.8Na0.2TaO3), electron glasses (compensated Si or GaAs), and vortex glasses in superconductor junction arrays. Apart from the impractically long relaxation times, contacting and learning at such nanoscale levels are problems virtually impossible to solve, at least with today's technology. In addition, full connectivity, which is assumed in the glassy system models, does not really happen in these physical systems due to the finite range of physical interactions.

BRIEF DESCRIPTION OF THE DRAWINGS

The invention is explained in detail hereinafter by way of example and with reference to the accompanying drawing, wherein.

DETAILED DESCRIPTION OF THE PREFERRED EMBODIMENTS

Despite the large variation in their architectures, the basic operation performed by neural nets is a non-linear mapping of the input onto the output in a parallel and, preferably, in an adaptive fashion. Below it is illustrated how an inhomogeneous physical substance with a non-linear stimulus-response characteristic can in principle be employed to represent a neural network. An electronic example of such a net of the invention is studied thereafter. Note that the invention is essentially technology-independent and that the principles of the invention are not restricted to electronic embodiments.

Prior Art

Neural networks are made of a collection of highly interconnected simple processors which, in the most interesting version program themselves adaptively in order to solve a given problem. What really makes neural networks systems rich is their highly varied interconnection styles between the processors. These styles determine the architecture of a neural net which can vary anywhere from a layer-to-layer interconnected feedforward network to a fully interconnected Hopfield network. Despite the large variation in their architectures, the basic operation performed by neural networks still is an adaptive non-linear mapping of the input onto the output in a parallel fashion. This non-linear mapping is demonstrated in a simplified three layer network shown in FIG. 1.

Figure 1:
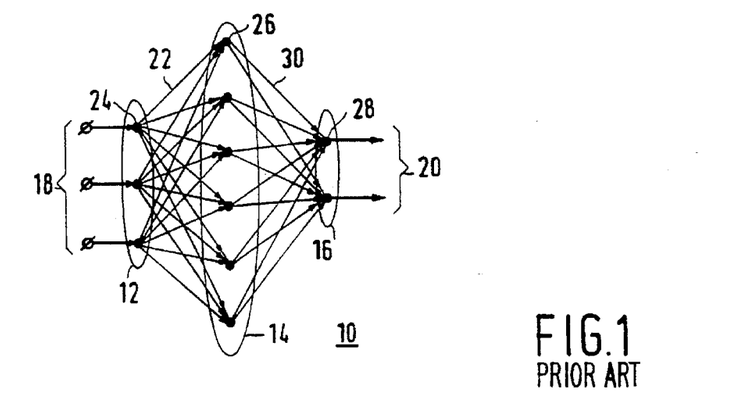
FIG. 1 illustrates the architecture of a conventional layered neural net.

FIG. 1 shows an example of a conventional architecture of a neural net 10. Neural net 10 is comprised of a plurality of successively interconnected neuron layers 12, 14 and 16 between an input 18 and an output 20. Each interconnection (synapse), e.g., 22 weights the signal provided by a source neuron, e.g., 24 by a particular factor (synaptic coefficient) and supplies the weighted signal to the input of a destination neuron, e.g., 26 in the next layer. Destination neuron 26 sums the thus scaled contributions of all its source neurons and applies a non-linear function (e.g., a sigmoid function) to the resulting sum for generating its output signal that in turn is supplied to a neuron, e.g., 28 of the next successive layer via synapse 30. Note that the essential operation of neural net 10 is a functionally distributed and parallel non-linear mapping of the input onto the output.

Principle of fully distributed embodiment

The invention provides a device, which will achieve non-linear mapping like neural nets such as the one of FIG. 1, but replaces the lumped parts of a neural network by fully and substantially continuously, spatially distributed functionalities.

Figure 2:
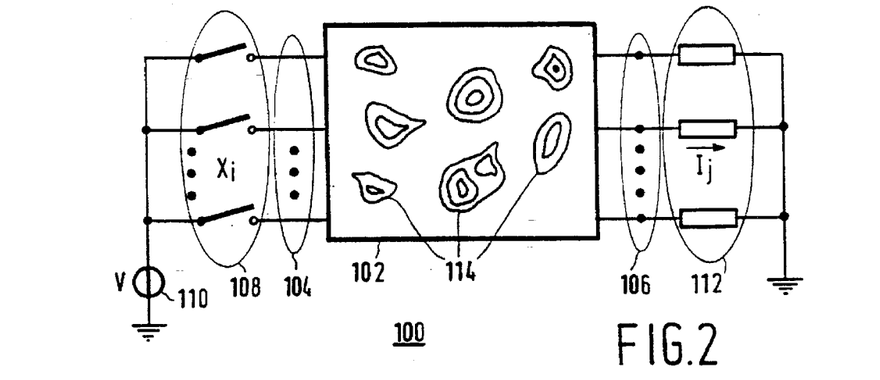
FIG. 2 gives an example of the neural net of the invention with an inhomogeneous non-linear electrically conducting layer.

FIG. 2 illustrates an example of a neural net 100 in the invention. Neural net 100 includes a non-linear multi-port inhomogeneous electronic layer 102 and a plurality of input contacts 104 and a plurality of output contacts 106. Input information to layer 102 is supplied through a set of N switches 108 connected to contacts 104. The binary (on or off) state of a particular switch "i" among switches 108 is denoted by $X_i$, for i=1,2, ... ,N. The states $X_i$ determine which ones of contacts 104 are connected to power supply 110 that provides a bias voltage V. The raw output from layer 102 is assumed to be a set of response currents, $I_j$ for j=1,2, ..., M, which flow out of the device through small resistors 112 to ground. Although the inputs and outputs can also be purely capacitive, this example considers the response of net 100 to a dc excitation through ohmic contacts 104 and 106. Contacts 104 and 106 are shown to be arranged at the periphery of layer 102, although this does not have to be so in practical implementations. The embodiment of neural net 100 is assumed to be a planar device in this example to be able to facilitate the implementation. The type of vector mapping discussed below emphasizes binary input vector components rather than continuous input signals. This is done to simplify the analysis of the examples.

Assume that an input vector $\underline{X}^m$ is presented as a series of the binary conditions (open=0; closed=1) of switches 108. Superscript "m" differentiates vectors corresponding to different sets of binary input signals. The associated responses, i.e., the components of current vector $\underline{I}X^m$, show non-linear correlations between the input vector components $X^m_i$ and the contents of network 100. The contents of network 100 is represented by the distribution pattern of inhomogeneities and non-linearities 114 serving as neural "weights". The general form of response current $I^m$ can be written as:

$$\underline{I}^m = VG^m \underline{X}^m; \qquad (i)$$

where $G^m$ is the non-linear conductance tensor of the network, depending on the pattern m and on bias voltage V. Note the structure of formula (i) reflecting that of Ohms' law. Written out in its indexed components, formula (i) equals:

$$I^m_j = V \Sigma^M_{i=1} G^m_{ji}(V) X^m_i; \qquad (ii)$$

The system under study is assumed not to show negative differential resistance (NDR) properties for this moment. As is discussed below, if layer 102 has NDR, many of the encoding techniques mentioned here get simplified.

Signal diagrams

Figure 3:
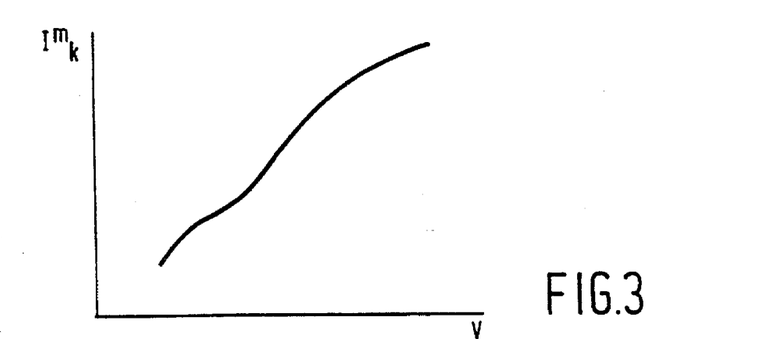
FIGS. 3 and 4 illustrate stimulus-response diagrams for the embodiment in FIG. 2.
Figure 4:
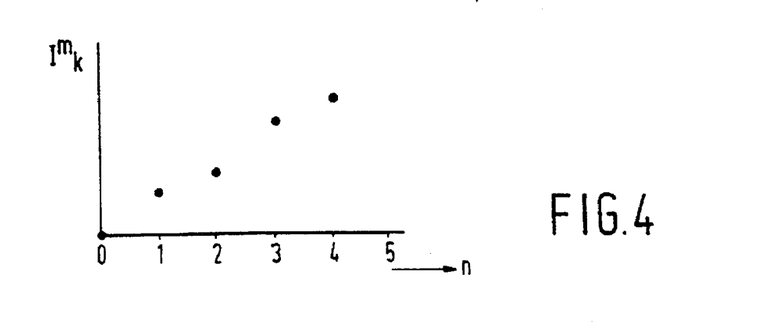

Since NDR effects are assumed not to be involved, the expected response currents $I^m_j$ as a function of input bias level V and input vector components $X^m_i$ can be schematically given as shown in FIGS. 3 and 4. FIG. 3 gives the dependence on bias voltage V of current $I^m_k$, produced at an output contact "k" in response to input pattern $\underline{X}^m$. As is clear, current $I^m_k$ is a monotonic function of V. FIG. 4 shows the dependence of current $I^m_k$ on the total number "n" of closed switches 108. Again, current $I^m_k$ is a monotonic function of additions to the sum $K = \Sigma^M_{i=1} X^m_i$, i.e., of the total number of closed ones of switches 105. Note that the schematic response of any of output contacts 106 as a function of $\underline{X}^m$ shown in FIG. 4, is similar to the response obtained from a functional MOS transistor which couples several capacitive (gate) inputs to a single output current (source-drain) to achieve a neuron-MOSFET. See: "A Functional MOS Transistor Featuring Gate-Level Weighted Sum and Threshold Operations", T. Shibata et al., IEEE Trans. Electron Devices, vol. 39, 1992, pp.1444–1455.

If, due to the monotonic output response of non-linear layer 102, the output signal were to be defined simply as:

$$O^m = I^m - I_{threshold}; \qquad (iii)$$

then closing an additional one of the switches 108 and/or increasing the bias level to V+dV would always give rise to a change of fixed polarity in the output signal O, that is, an increase in above example. In other words, encoding the output information according to (iii) does not provide inhibitory behaviour. If non-linear mapping, as in neural nets, is to be achieved, inverse effects such as negative contributions or inhibition should be produced by some of the input signals $X^m_i$. In addition, it should be shown that electronic signal crossing between two opposite cross coupled pairs of input and output contacts is possible to accomplish signal correlation. To this end, the non-linearities in the system could be used in encoding the information at the output. The non-linearities can have positive or negative sign as opposed to unipolar nature of the net (total) response from our system. Another useful type of encoding of the responses from the non-linear conducting layer 102 could be obtained by enhancing high order effects. This enhancement can be achieved by utilizing differential output signals or relative output signals. For example, the following encoding schemes can be used:

$$O^m{}_j = I^m{}_k - I^m{}_p; \quad \text{(iv)}$$

$$O^m{}_j = I^m{}_j / I^m{}_{tot}; \quad \text{(v)}$$

$$O^m{}_j = \delta_v(I^m{}_j); \quad \text{(vi)}$$

The first option in (iv) defines component j of output signal $O^m$ as the difference between the response currents supplied at an output with index "k" and at an output with index "p". The second option in (v) gives the output component j of $O^m$ as the current $I^m{}_j$ normalized to the total current associated with on/off switch pattern "m". The third option of (vi) is the differential output as a function of changes in bias V, that in itself can be considered as an input signal affecting the response currents as do the input signals $X^m{}_i$. The bias voltage change can be, e.g., a ramped, a sinusoidal or a pulsed excitation. Related to this latter case, one can also encode the information in the amplitude of different signal harmonics of the bias voltage change. Note that output functions (iv)–(vi), and especially (iv) and (v), are rather simple and can be implemented easily at the output. A threshold current $I_{threshold,j}$ can be subtracted from any of the currents $I^m{}_j$ for detecting the polarity of the results in each case. With these definitions, the encoding described above is analogous to the function of the output neurons in conventional Neural Networks.

It is shown below, with simple examples, that the types of encoding (iv)–(vi) allow for effects like inhibition and signal crossing. To this end, equation (ii) is rewritten as a series expansion:

$$I^m{}_j = \Sigma^M{}_{i=1}[G_{1,ji}X^m{}_i V + [\Sigma^M{}_{k=1} G_{2,jik} X^m{}_i X^m{}_k V^2 + + [\Sigma^M{}_{p=1} G^m{}_{3,jikp} X^m{}_i X^m{}_k X^m{}_p V^3 + \ldots]]]. \quad \text{(vii)}$$

To be able to proceed further analytically, consider a non-linear conducting plane 102 with only two input contacts 104 and two output contacts 106. Then, index m takes the values=0, 1, 2 and 3 for input vectors $\underline{X}^m$ (0,0), (1,0), (0,1) and (1,1), respectively. In addition, assume that the non-linearity in the system is limited to second order terms only. In this case, the currents of (vii) can be written as:

$$I^m{}_j = \Sigma^2{}_{i=1}[a_{ji} X^m{}_i V + [\Sigma^2{}_{k=1} c_{jik} X^m{}_i X^m{}_k V^2]]; \quad \text{(viii)}$$

Coefficients "a" and "c" used here replace the linear and non-linear conductances $G_1$ and $G_2$, respectively. Equation (viii) represents a set of eight equations, second-order in V, for the two currents. Using equation (viii) and the encoding options of (iv)–(vi), it is shown below how to obtain inhibitory effects and signal crossing in the simplified non-linear conducting layer network of the invention with two input and two output contacts.

For the first encoding option (iv) there is only one real output to consider because, in this case, $O_m{}^1$ uses the difference between the currents at the two output contacts. With above formulation, it is easy to show that the output signal of the network for $\underline{X}^3 = (1,1)$ is:

$$O^3{}_1 = O^1{}_1 + O^2{}_1 + 2(c_{112} - c_{212})V^2; \quad \text{(ix)}$$

Equation (ix) shows that, due to the last term which can be negative, $O^3{}_1$ can become smaller than $(O^1{}_{1+}O^2{}_1)$ and, with proper choice of conductivities $c_{112}$ and $c_{212}$, even negative. With such an output an XOR operation can be realized in net 100 without any negative polarity in the individual currents $I^m{}_j$. Since conventional neural nets require negative connections or inhibition to achieve an XOR operation, the result given above shows that the relative responses of non-linear conducting layer 102 also carries inhibitory information if the non-linearities are chosen appropriately. Note that such a result would not be possible with a purely linear layer, because the last term in (ix) would then be missing.

In order to show signal crossing, i.e. a first and a second output signal being each composed of contributions produced by more than one input signal, at least two input and two output contacts 104 and 106 are needed. For a simplified 2-input/2output conducting layer 102, the encoding option of (v) is chosen. Using above notation where m=0, 1, 2 and 3 for input vectors $\underline{X}^m$ (0,0), (1,0), (0,1) and (1,1), respectively, and a little algebra, it becomes clear that, in order to have signal crossing, it needs to be proven that the following states are attainable:

$$(O^1{}_1 - O^2{}_1) < 0 \text{ and } (O^1{}_2 - O^2{}_2) > 0; \quad \text{(x)}$$

or, in plain language, that the contribution of the input at contact "i=2" dominates the output at contact "k=1" and that the contribution of the input at contact "i=1" dominates the output at "k=2". Proving the validity of conditions (x) is equivalent to showing that the difference:

$$\Delta = I^2{}_2 I^1{}_1 - I^1{}_2 I^2{}_1 \quad \text{(xi)}$$

can be negative. For a linear conducting layer 102, this condition would translate into $a_{11}a_{22} < a_{12}a_{21}$, which is physically unacceptable as a larger current would result from the activated input contact farthest away. In order to show that $\Delta$ can plausibly be negative with a non-linear conducting layer, assume that all linear elements of the linear conductance matrix are equal and that the non-linearities can be treated as small perturbations. With these conditions, $\Delta < 0$ translates into $$c_{122} + c_{211} > c_{111} + c_{222}; \quad \text{(xii)}$$

This last condition can be satisfied easily by sub-linear (saturating) direct conductances and superlinear cross conductances. It is very easy to demonstrate this effect in a "Y" resistor network where each branch contains a linear resistor except one branch that includes a non-linear resistor. If: a) one of the outputs is connected to the non-linear resistor and the other output to a linear one; and b) one of the inputs is connected to the remaining linear resistor and the other to the centre node, then application of (1,0) and (0,1) inputs can generate differential (0,1) and (1,0) outputs with proper choice of resistor values and non-linearity. Similar examples can be given for the encoding technique stated in (vi). As stated earlier, in this last case, also output harmonics of periodic input signals can be utilized in addition to slopes of conductance changes.

Physical operation

In order to go into more detail, consider a device with a two-dimensional non-linear conducting layer representing an inhomogeneous surface inversion layer in a field effect device. It is assumed that this layer is composed of an array of electron puddles with mutually different electron densities due to the differences in the surface potential distribution. It is shown below that the intrinsic non-linear vector mapping abilities of a non-linear surface conducting layer in this simplest form are attained. Any additional features introduced at a later stage will then enhance the effects. The physics of the device concept studied here may be considered to be similar in nature to the experimental MOS-device of Shibata cited above. However, the prior art device of Shibata only serves to implement the synaptic connections for a single Neuron. In sharp contrast to the cited art, the non-linear electronic layer in the invention is utilized as a distributed neural transformation system to act as a full neural network between multiple input and multiple output terminals. This crucial difference may require proper encoding as described in the previous section to be able to extract the required information.

Figure 5:
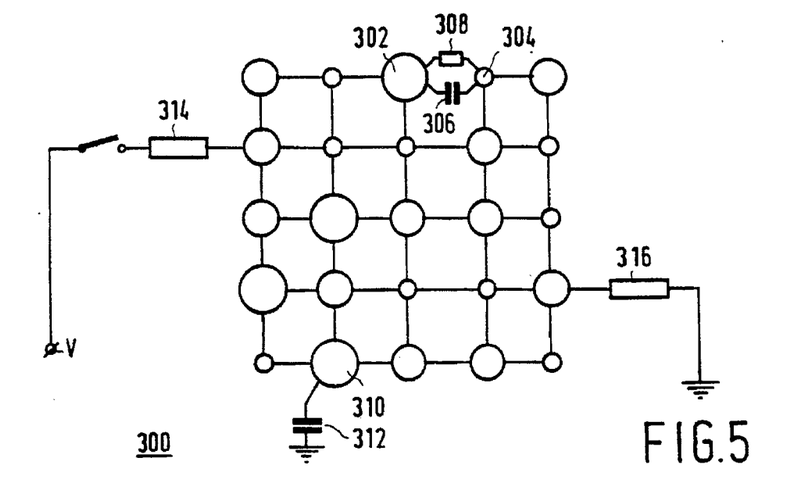
FIG. 5 shows the functional distribution of inhomogeneities in the layer of FIG. 2.

FIG. 5 schematically illustrates such a device 300 in the invention. Device 300 functionally comprises an inhomogeneous array of dots representing locations of free electron puddles such as 302 and 304 in an inhomogeneous surface inversion layer in a field effect device. Puddles 302 and 304 are formed by trapped positive charges within an insulator (not shown) at the surface. These electron puddles are electrically coupled to one another, here schematically illustrated only for the pair of puddles 302 and 304, by means of non-linear capacitances, e.g., 306, and non-linear conductances, e.g., 308. Each respective one of the puddles further is capacitively coupled to ground, indicated here for a single puddle 310 by way of capacitance 312. The input/output signals are provided at contacts on the periphery via linear resistors, of which only resistors 314 and 316 are shown. As indicated above, the input/output contacts do not always have to be at the periphery, but can also be distributed within the surface area. This latter option may be especially beneficial in, for example, image processing applications where the input is supplied optically to the frontal surface as a two-dimensional signal.

The transport in the layer shown in FIG. 5 is modeled by simplified and normalized equations approximating the basic features of the conduction in an inhomogeneous surface inversion layer of a large area sub-threshold semiconductor device. For background information on the physical aspects, see Shibata. The non-linear current flowing among the puddles is given by:

$$I_{dot,i} = \exp(\alpha/T) \text{ for } \alpha \leq 0; \ I_{dot,i} = 1 + (\alpha/T) \text{ for } \alpha > 0; \quad (xiii)$$

wherein $I_{dot,i}$ represents the net electron current flowing out of a puddle, the puddle being denoted by index "i", wherein $\alpha$ is defined by $$\alpha = (E_{F,i} - E_{bar,i}); \quad (xiv)$$

Figure 6:
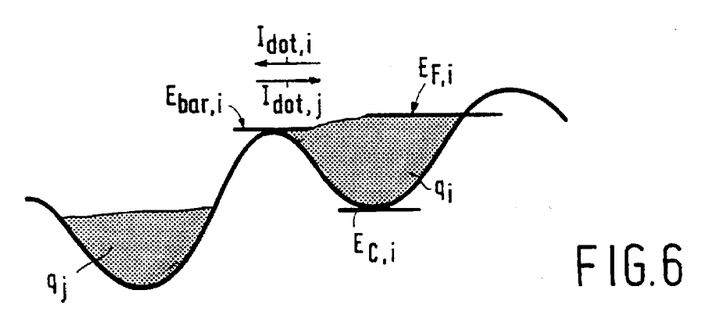
FIGS. 6 and 7 give background information to formulae in the text relating to the operation of the non-linear inhomogeneous layer.

$E_{F,i}$ being the Fermi level associated with puddle "i", $E_{bar,i}$ representing the height of the potential barrier between puddle "i" and one of its neighbours "j", and wherein T represents a normalized absolute temperature. Barrier height $E_{bar,i}$ in a real device depends on the potential appearing between electron puddles and is given by the following empirical relation:

$$E_{bar,i} = E_{c,i} + [b_0 - b_1(E_{c,i+1} - E_{c,i})]; \quad (xv)$$

wherein $E_{c,i}$ is the conduction band edge and $b_0$ and $b_1$ are constants. For a representation of these quantities see FIG. 6.

The capacitances between two puddles are assumed to depend on the number of carriers contained within these puddles and they are given by:

$$C_{ij} = d_0/(d_1 - q_i - q_j); \quad (xvi)$$

wherein $d_0$ and $d_1$ are constants and $q_i$ and $q_j$ represent the number of charges in puddle "i" and neighbouring puddle "j". This equation simply approximates the fact that capacitances, e.g., 306 between puddles containing fewer charges are smaller. The capacitance 312 between each puddle and ground is taken as a constant. No special attention has been given on fitting the form or the parameters appearing in these equations to real devices. For this, one has to start with device level equations treating (in this example) MOS physics properly. This is not necessary for the present, as only the basic concept of vector mapping in a general non-linear layer is presented. The exact form of the non-linearities appears to be not crucial to the operation of the conducting layer as a vector mapping network. The response of the model system described above is calculated numerically by using the discretizised Poisson equation and the current continuity equation.

Figure 7:
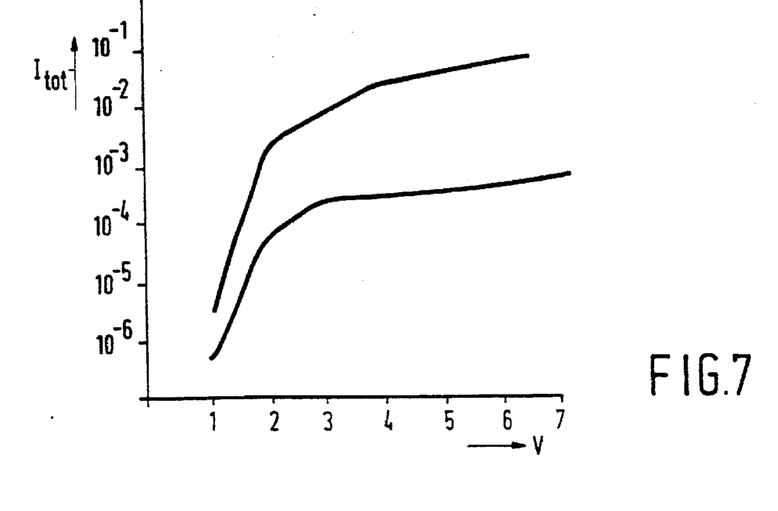

With the model described above, first the input bias dependence of the conductances, e.g., 308 in the layer is examined. This is done by applying the input bias voltage V at only one of the inputs of the device and observing the total current across the device as a function of the value V of the input bias. The results are shown in FIG. 7 for two different values of the input/output resistances 314 and 316. The basic appearance of these characteristics is similar to the sub-threshold response of a single MOSFET. In the present case however, we functionally do have a collection of interconnected floating sub-threshold MOSFETs. The results in this figure can also be interpreted as a bias-dependent "percolation" through the puddles of the device. There is no sharp cut-off to zero current at low biases, in contrast to real percolative models, due to the nonzero temperature parameter taken into account in the calculations.

Figure 8:
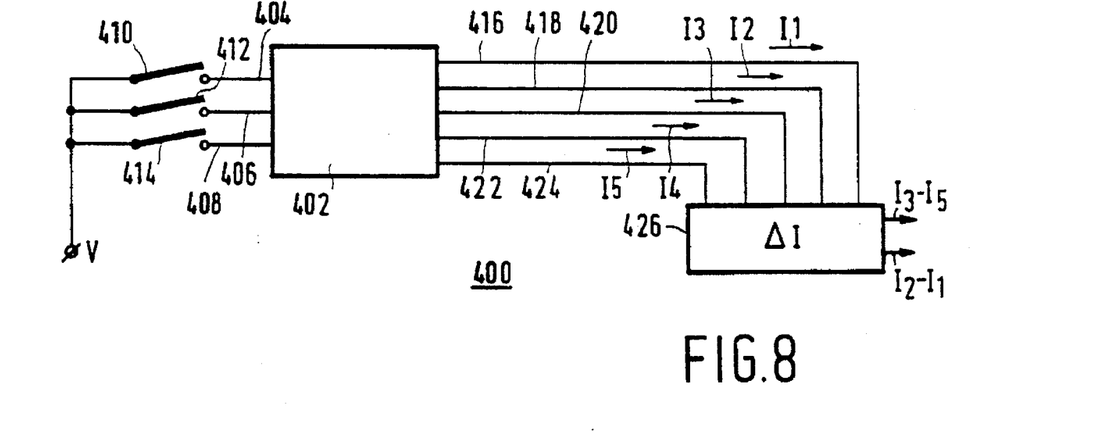
FIGS. 8, 9, 10 and 11 illustrate a simple quantitative example of the operation of a neural net in the invention.
Figure 9:
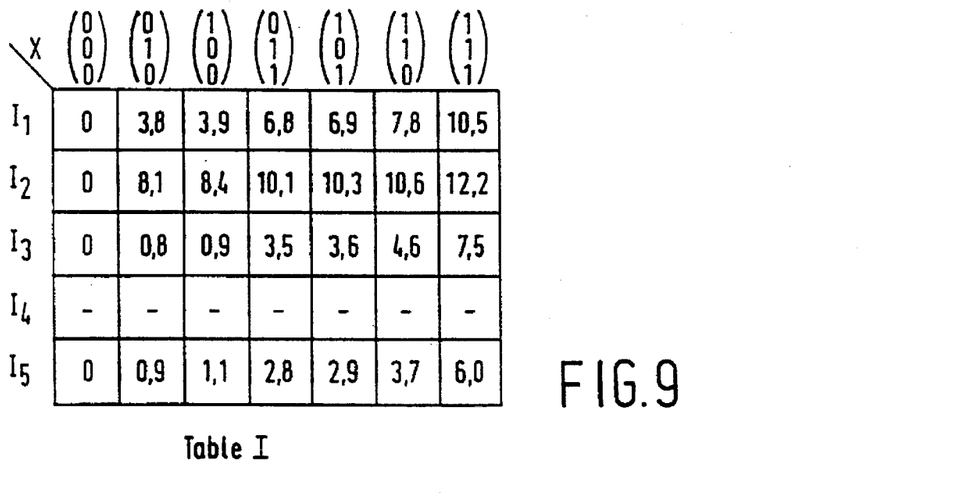
Figure 10:
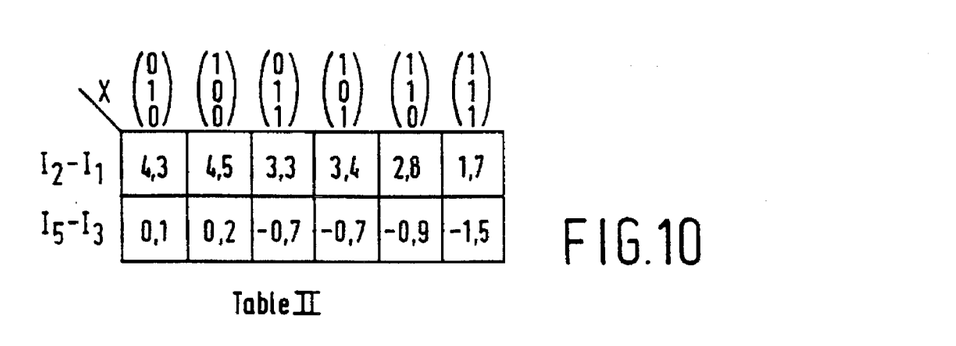

Next, the input/output relation is discussed for a 3-input/5-output example 400 of device 300 with reference to FIGS. 8, 9 and 10. Device 400 includes a non-linear conducting layer 402 with three input contacts 404, 406 and 408, that can be connected to power supply V through switches 410, 412 and 414. Layer 402 further includes five output contacts 416, 418, 420, 422 and 424 to supply response currents I1–I5 dependent on which ones of switches 410–414 are closed. The response currents are fed to a circuit 426 to determine differential quantities as discussed under equation (iv) above. Note that circuit 426 can simply be a resistance coupled between two output contacts. The voltage over this resistor then is indicative of the net current through the resistance.

Figure 11:
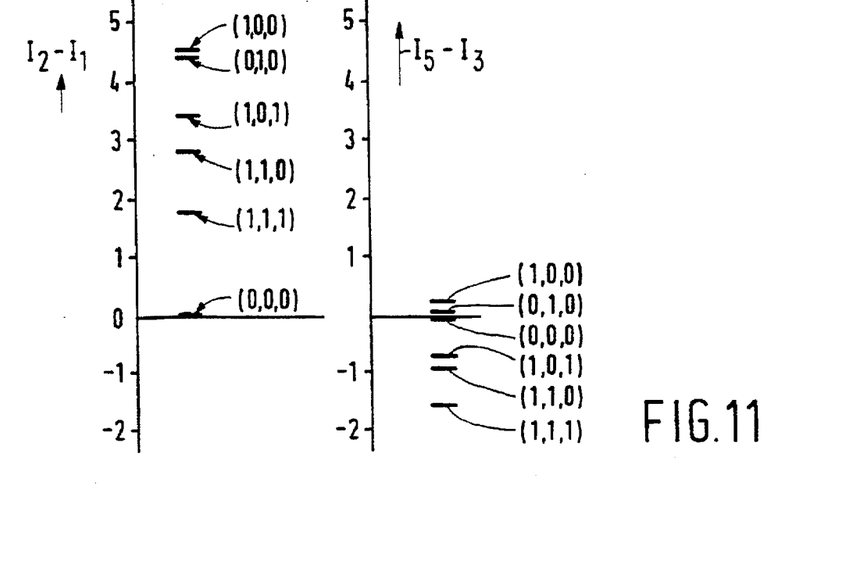

FIG. 9 gives a Table I showing the values of response currents I1–I5 in predetermined units, e.g., mA, as a function of input patterns X of open or closed ones of switches 410–414. In vector notation, $X=(X1, X2, X3)^T$, wherein X1 corresponds with the state of switch 410, X2 corresponds with the state of switch 412 and wherein X3 corresponds with the state of switch 414. Component Xi equals unity if the associated one of switches 410–414 is closed, thereby connecting power supply V to the appropriate one of contacts 404–406, and is zero otherwise. Output contact 422 is assumed to be disconnected for this example. FIG. 10 gives a Table II giving the differential values between currents I2 and I1, and between currents I3 and I5. The information in Table II is visualized in the diagram of FIG. 11. FIG. 11 clearly demonstrates how output signal I5-I3 changes from positive to negative, or, in other words, provides inversion when the system receives more input signals. Output signal I2-I1 on the other hand demonstrates the XOR operation, and therefore signal crossing, as the input vectors (100), (010), (110) and (000) produce outputs of (+), (+), (−), and (−) polarity, respectively, with regard to, e.g., a level of I2-I1 equal to 3,5. A logic output signal is simply produced by way of appropriate thresholding and subsequent limiting. Other encoding schemes than the one providing differential outputs, such as the ones in equations (v) and (vi), give inversion and signal crossing as well. The output examples given here are obtained after conducting non-linear layer 402 has reached a steady equilibrium state. If the output current values are probed before such a steady state is reached, then the relative values of the output currents in such a conducting plane can be totally different from the ones listed in Table II. Intermixing of signals in this transient regime may turn out to be more easily achievable as compared to the intermixing in the steady state situation.

A negative-differential-resistance (NDR) effect is attained in the inhomogeneous inversion layer array by letting the current decrease slightly as a function of increasing bias voltage difference across the electron puddles. Due to this NDR, the relative locations of output current values are highly intermixed for different input vector configurations. In addition, the input node current values also show such non-linear intermixing. It is obvious that such responses result in non-trivial non-linear vector mappings by simple thresholding without the need to apply any of the coding methods given in (iv), (v) and (vi).

Figure 12:
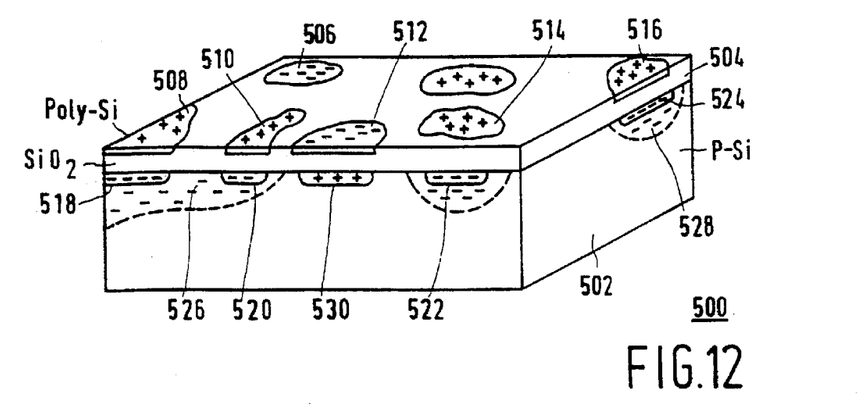
FIGS. 12, 13, 14, 15 and 16 give detailed examples of the layered structure in a neural net of the invention.

FIG. 12 shows a portion of a non-linear inhomogeneous electrically conducting transport structure 500 for use as a layer 102 in a neural net of the invention. Structure 500 includes a semiconductor substrate 502, for example of P-doped silicon, and an electrically insulating layer 504, for example silicon dioxide. Layer 504 is provided with charge trapping regions 506, 508, 510, 512, 514 and 516, for example of polycrystalline silicon or silicon nitride. Electrical charges of a predetermined polarity type, positive in this example, trapped in one or more of regions 506–516 induce inversion regions, such as 518, 520, 522 and 524, and depletion regions, such as 526 and 528 in substrate 502 near insulating layer 504. Trapped electrical charges of the other polarity, here negative, induce accumulation regions, such as 530, in substrate 502 near insulating layer 504. Thus, the trapped charges specify location-dependent conductivity properties in substrate 502 establishing an electrical transport structure 500 based on field effect operation.

Figure 13:
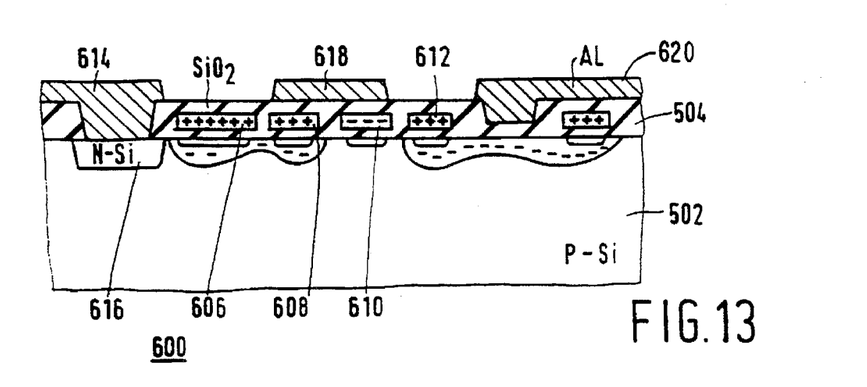

FIG. 13 illustrates a portion 600 of structure 500 in a neural net of the invention. Portion 600 includes part of substrate 502 and of insulating layer 504 discussed under FIG. 12. Insulating layer 504 houses charge trapping regions 606, 608, 610 and 611 in order to create inversion regions, depletion regions and accumulation regions as discussed previously. An ohmic contact 614, e.g., of aluminum, to an N-doped region 616 in P-doped substrate 502 is used to supply an input signal or to transport the response current effected at that location by the input signals. Alternatively, contact 614 can be used as an additional long range interconnection to galvanically or capacitively couple two or more remote areas of substrate 502, e.g., in order to circumvent short range effects due to screening. Contacts 618 and 620 are used as capacitive inputs to substrate 502, either directly such as 620 or indirectly via charge storage regions 608 and 610. Again, contacts 618 and 620 are used individually to apply an externally generated input signal or an internally generated signal by way of feedback mechanism.

Note that the structure in FIG. 13 utilizes a fairly homogeneous and substantially uniformly doped substrate 502. The inhomogeneities induced by the charges trapped in regions 606-610 are only perturbations superposed onto a homogeneous configuration. This simple arrangement suffices to achieve non-linear and fully distributed mapping as in a conventional neural net. However, substrate 502 may in addition contain an array of N-doped regions (not shown here) or heterostructure regions (not shown here) adjacent insulating layer 504 in order to enrich the electric transport properties by providing negative differential resistance or optoelectronic effects.

Long range

Figure 14:
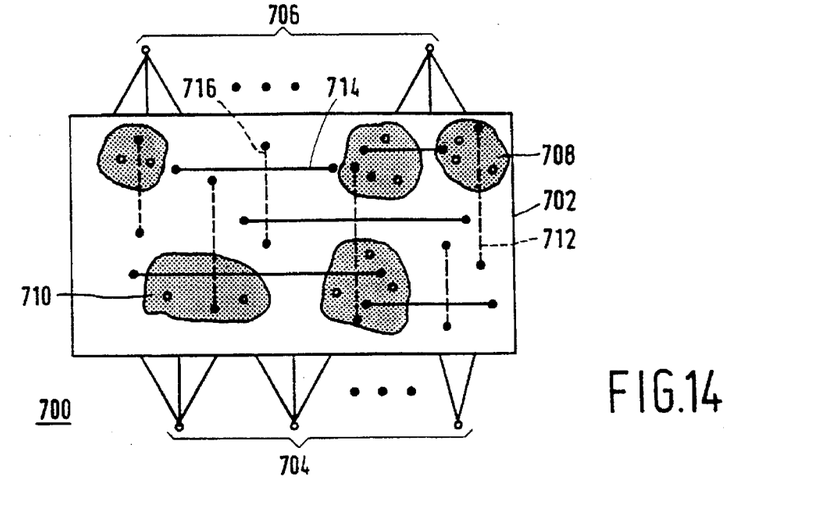

The above mentioned screening effects will occur in systems that are large in relation to the range of certain interactions. These effects will adversely affect the discrimination between responses to different sets of input signals. Therefore, beyond a given size of the system in the invention, resolution and noise become important. One way of compensating these drawbacks is to use more contacts to extract more responses that combined produce the output signal(s). Another way, already briefly mentioned above, is to provide a few long-range interconnects, conductive or capacitive, between various locations distributed over the device. This could be attained by a pattern of substantially equal conductance distance between the locations interconnected. FIG. 14 illustrates an example of such an arrangement 700 that is implemented in a technology similar to that for portion 600 of FIG. 13. Arrangement 700 is comprised of a semiconductor substrate 702 with a plurality of input contacts and output contacts 704 and 706, a plurality of inhomogeneous domains such as 708 and 710, and a plurality of long range interconnects such as 712, 714 and 716. Long range interconnects 712–716 serve to equalize an average electrical path length between different ones of input-output contact pairs. Note that since arrangement 700 is inhomogeneous in large scales as well in a conductive state, it is expected that the number of long range interconnects 712–716 is relatively small. Note that wafer-scale integration is a suitable technology to implement vast versions of such a system.

Learning

In order to provide learning facilities, some measures are needed to selectively modify the transport properties of substrate 502, for instance, by modifying the amount of charge trapped in mapping regions 506–516. As known, conventional neural nets learn by means of adapting the strengths (or weights or synaptic coefficients) of the synapses on the basis of training examples. A well known learning strategy is the backpropagating mechanism applied to a layered net, such as the one of FIG. 1. Therein, a discrepancy between an obtained output signal of layer 16 and a desired output signal defines an error quantity that is minimized by changing the synaptic coefficients according to a steepest descent algorithm. This method is based on the individuality of each neuron functionality and of each synapse functionality. Note that in the present invention individual neurons and individual synapses cannot be distinguished.

Figure 15:
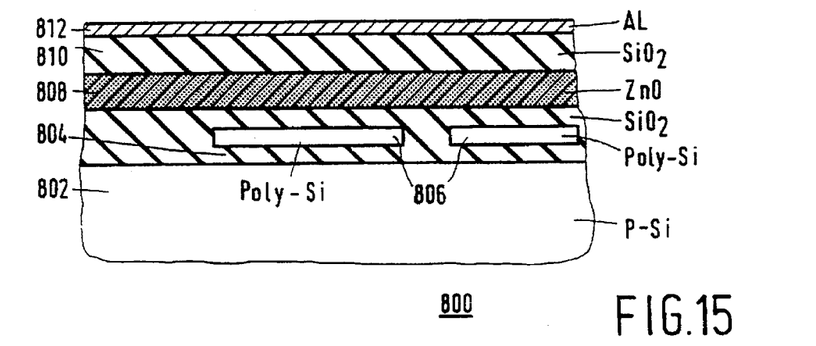

FIG. 15 gives an example of a neural net in the invention comprising an electrical transport structure 800 including learning facilities. As structure 800 is partially similar to portion 600, reference is made to FIG. 13 and its discussion above for the electrical transport aspects. Structure 800 includes a semiconductor substrate 802 of, e.g., P-doped silicon, an electrically insulating layer 804 of, e.g., silicon dioxide, a charge trapping layer 806 of, e.g., polycrystalline silicon, islands of polycrystalline silicon embedded in insulating layer 804, or silicon nitride, a piezoelectric layer 808 of, e.g., zinc oxide, for the propagation of mechanical stress waves and electrically isolated from layer 806, an insulating layer 810 of, e.g., silicon dioxide, and an electrically conductive layer 812 such as aluminum or tungsten, functioning as a (global) gate as in a field effect transistor.

Learning is as follows. Assume that the initial trapped charge distribution in layer 806 gives rise to incorrect responses when being given a particular set of predetermined input signals. Then mechanical stress waves are created in piezoelectric layer 808 of finite size. The waves may be stochastic. A standing wave pattern is established due to reflections throughout layer 808. This in turn produces an standing electric field pattern that affects the electrical transport properties in substrate 802, in addition to the electric field of the trapped charges in layer 806. The stress pattern either improves the responses or worsens them. If the stress pattern improves the responses, the perturbation produced by the associated electric field is frozen. The effects of the stress field are replaced by a modification of the trapped charge distribution. One way of doing this is to apply a bias voltage at global gate 812. Such a bias voltage should be just below the threshold of tunnelling between the charge trapping layer 806 and substrate 802. This is comparable to the write/erase threshold of EEPROMs. The electric field produced by the spatially varying stress field is added to the constant bias of global gate 812. As a result, the total electric field between charge trapping layer 806 and substrate 802 is selectively controlled to locally exceed or stay below the threshold, thereby selectively enabling charge tunnelling. This type of learning may be termed "Stochastic Learning".

Many variations can be included in the application of the bias, stress field and charge trapping. For example, with proper design, charging may be achieved by charge transport to and from global gate 812. A plurality of mutually electrically isolated global gates 812 may be provided in a predetermined geometrical pattern. Note that, for example, GaAs is piezoelectric. An epitaxial GaAs layer separated from a GaAs substrate by an insulating layer may provide both piezoelectric facilities and electronic signal transport. Also layers 806–810 may be replaced by a layer of ferroelectric material. As known, a ferroelectric is a material having domains whose electric dipole field can be selectively modified. Ferroelectric materials are used in certain types of non-volatile memories.

Figure 16:
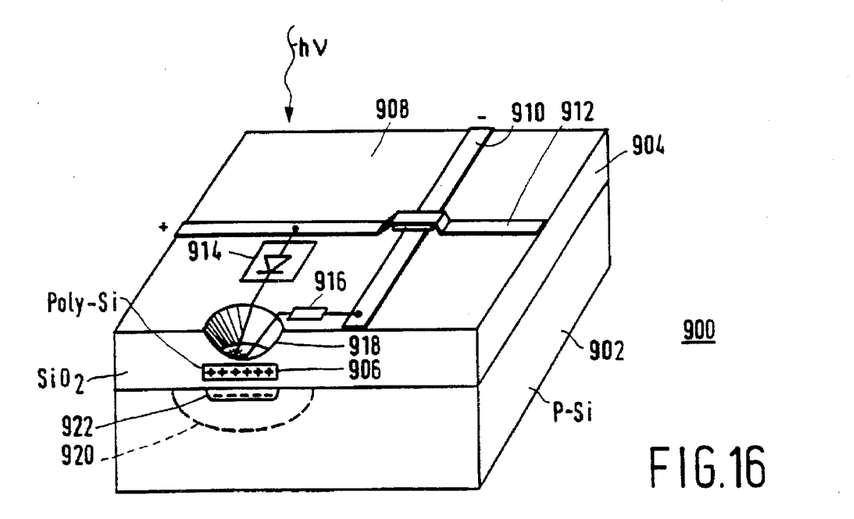

FIG. 16 illustrates another example of a layered structure 900 for use as a cell in a learning neural net in the invention, based on opto-electronics. Structure 900 includes a semiconductor substrate 902, for example of P-doped silicon, an insulating layer 904, for example of silicon dioxide, and a charge trapping region 906, for example of polycrystalline silicon, embedded in insulating layer 904. An upper surface 908 of structure 900 carries electrodes 910 and 912 connected to opposite poles of a power supply (not shown). Electrode 912 is connected to a photodiode 914 and electrode 910 is connected to a resistor 916. Photodiode 914 and resistor 916 are interconnected via a node 918 located near charge trapping region 906. Incident light rays on photodiode 914 cause the potential at node 918 to change, thereby locally affecting the charge distribution in, and hence the transport properties of the substrate. In case of an improved output (learning) of the neural net due to these changes, the trapped charge in region 906 is adapted by applying a large bias voltage, e.g., via electrodes 910 and 912, to cause tunnelling between electrodes 910 or 912 and charged trapped region 906.

A plurality of such cells of photodiodes and resistors can be arranged in a predetermined configuration, e.g., in a rectangular grid or in a radial fashion to imitate the retina, in order to enable pattern recognition. Each pixel of an image then is mapped onto a corresponding photodiode thereby affecting the associated transport properties in terms of depletion layers 920 and inversion layers 922.

What is claimed is:

1. An information processing system with a neural network processor, the processor comprising:

an input means for receiving a plurality of input signals;

an output means for providing at least one output signal;

an arrangement between the input means and the output means for implementing a neural transformation of the plurality of input signals for generating the output signal, wherein the arrangement comprises:

a substantially continuous medium for propagating a response field as an unchanneled wave pattern throughout the medium in response to the plurality of input signals, the response field being non-linearly dependent on at least one of the input signals, and wherein the medium has at least one inhomogeneity for affecting the wave pattern of the response field in the medium, the medium producing the output signal upon coupling at least a first response representative of the response field at a first location in the medium, to the output means.

2. The system of claim 1, wherein the arrangement comprises encoding means coupling the medium to the output means for producing the output signal upon correlating the first response and a second response.

3. The system of claim 2, wherein correlating comprises at least one of the following:

producing a respective output signal involving a difference between a respective pair of responses;

producing a respective output signal involving a ratio of respective response and a sum of responses; and producing a respective output signal involving a change of a respective response brought about by a change of a particular one of the input signals.

4. The system of claim 3, wherein a first one of the input signals is of a first physical type and a second one of the input signals is of a second physical type different from the first physical type.

5. The system of claim 2, wherein a first one of the input signals is of a first physical type and a second one of the input signals is of a second physical type different from the first physical type.

6. The system of claim 1, wherein a first one of the input signals is of a first physical type and a second one of the input signals is of a second physical type different from the first physical type.

7. The system of claim 6 wherein the first physical type is a DC voltage and the second physical type is an AC voltage.

8. The system of claim 6 wherein the first physical type is a current and the second physical type is photon energy.

9. The system of claim 1, wherein the arrangement comprises a connection means between at least a second location and a third location in the medium for enabling an interaction between the response field at the second location and the response field at the third location.

10. The system of claim 1 wherein the arrangement comprises control means for selectively modifying the at least one inhomogeneity with regard to at least one of position, size or strength.

11. The system of claim 1, wherein the arrangement comprises a semiconductor substrate, and wherein the inhomogeneity includes at least one depletion region or an inversion region.

12. The system of claim 11, wherein the arrangement comprises a charge trapping region for inducing the depletion region or the inversion region.

13. The system of claim 1, wherein the arrangement comprises a control means for selectively modifying the at least one inhomogeneity with regard to at least one of position, size or strength;

wherein the arrangement comprises a charge trapping region for inducing a depletion region or an inversion region; and wherein the control means includes a piezoelectric layer for providing a location dependent electric field upon propagating stress waves through the piezoelectric layer and for thereupon selectively determining a tunnelling threshold for electrical charges to or from the trapping region.

14. The system of claim 1, wherein the arrangement comprises control means for selectively modifying the at least one inhomogeneity with regard to at least one of position, size or strength;

wherein the arrangement comprises a charge trapping region for inducing a depletion region or an inversion region; and wherein the control means includes a photoelectric element for providing a light-dependent voltage and for thereupon selectively determining a tunnelling threshold for electrical charges to or from the charge trapping region.

15. The system of claim 1, wherein the arrangement comprises a control means for selectively modifying the at least one inhomogeneity with regard to at least one of position, size or strength;

wherein the arrangement comprises a semiconductor substrate, wherein the inhomogeneity includes at least one depletion region or an inversion region; and wherein the control means include a ferroelectric layer operative to provide a location dependent electric field by way of selectively determining a polarization rotation of a ferroelectric domain in the ferroelectric layer.

* * * * *